(12) United States Patent
Komatsu

(10) Patent No.: US 8,665,872 B2
(45) Date of Patent: Mar. 4, 2014

(54) TRANSMISSION APPARATUS AND TRANSMISSION METHOD

(75) Inventor: Yoshihide Komatsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 13/064,469

(22) Filed: Mar. 28, 2011

(65) Prior Publication Data

US 2011/0261818 A1    Oct. 27, 2011

(30) Foreign Application Priority Data

Apr. 22, 2010 (JP) .................................. 2010-099061

(51) Int. Cl.
*H04L 12/28* (2006.01)

(52) U.S. Cl.
USPC ......................................................... 370/392

(58) Field of Classification Search
None
See application file for complete search history.

(56) References Cited

U.S. PATENT DOCUMENTS

| 5,293,487 | A * | 3/1994 | Russo et al. | 709/234 |
| 2001/0029546 | A1 | 10/2001 | Motoyama | |
| 2008/0285445 | A1 * | 11/2008 | Riddle et al. | 370/230.1 |
| 2009/0238196 | A1 * | 9/2009 | Ukita et al. | 370/408 |
| 2011/0091212 | A1 * | 4/2011 | Nonaka | 398/66 |

FOREIGN PATENT DOCUMENTS

| JP | 1-177737 | 7/1989 |
| JP | 06-276207 | 9/1994 |
| JP | 2001-285322 | 10/2001 |
| JP | 2005-26893 | 1/2005 |
| JP | 2006-033348 | 2/2006 |
| JP | 2008-153884 | 7/2008 |

OTHER PUBLICATIONS

Japanese Office Action mailed Jan. 7, 2014 in corresponding Japanese Patent Application No. 2010-099061.

* cited by examiner

*Primary Examiner* — Dang Ton
*Assistant Examiner* — Ronald H Davis
(74) *Attorney, Agent, or Firm* — Staas & Halsey LLP (57) ABSTRACT

When a packet received from a ring network is addressed to a device on a local network established under a transmission apparatus, then that transmission apparatus detects whether a memory device installed therein is in the memory full state. If the memory device is determined to be in the memory full state, then the transmission apparatus sends the packet, which was received from the ring network, back to the ring network. Subsequently, when the memory device recovers from the memory full state, the transmission apparatus sends the packet to the specified device in the local network.

6 Claims, 10 Drawing Sheets

TRANSMISSION APPARATUS AND TRANSMISSION METHOD

CROSS-REFERENCE TO RELATED APPLICATION

This application is based upon and claims the benefit of priority of the prior Japanese Patent Application No. 2010-099061, filed on Apr. 22, 2010, the entire contents of which are incorporated herein by reference.

FIELD

The embodiments discussed herein are directed to a transmission apparatus and a transmission method.

BACKGROUND

Typically, in a ring-type network (hereinafter, referred to as "ring network"), transmission apparatuses constituting the ring network communicate packets with one another. Each of such transmission apparatuses sits on top of a separate local network. From a device constituting the local network established under a particular transmission apparatus, a packet is transmitted to a device constituting the local network established under another particular transmission apparatus via other transmission apparatuses constituting the ring network.

Once a transmission apparatus receives a packet, it stores that packet in a buffer memory or the like on a temporary basis and then transmits the packet to a device specified as the destination address in the corresponding local network. Herein, in that state of the buffer memory in which no more memory capacity is available (hereinafter, referred to as "memory full state"); the transmission apparatus cannot transmit the packet to the corresponding local network. Hence, the transmission apparatus destroys that packet. As a substitute for the destroyed packet, the source apparatus resends a packet.

Meanwhile, regarding the issue of the memory full state, a technology is known in which a backup memory area is secured and the transmission apparatus is maintained in the duplexed state. Moreover, regarding the issue of the memory full state, another technology is known in which the packets are first sent to a device constituting the local network of another transmission apparatus having free buffer memory and then sent to a device specified as the destination address via a different transmission path. Another technology is known in which the inward traffic of packets is restricted in the source transmission apparatus.

However, in the conventional technologies, the packets transmitted in the ring network suffer from degradation of transmission efficiency and reliability. More particularly, in the technology of securing a backup memory area and maintained the transmission apparatus in the duplexed state, an increase in the number of devices or apparatuses may lead to an increase in the rate of occurrence of failures. Eventually, that results in the degradation of quality and reliability. In the technology of transmitting a packet via a different transmission path, the header of the packet frame undergoes transformation and the memory is burdened in the other device receiving the packet. That results in the degradation of reliability. In the technology of restricting the inward traffic of packets, the transmission quantity as well as the transmission efficiency undergoes degradation.

Patent Document 1: Japanese Laid-open Patent Publication No. 2008-153884
Patent Document 2: Japanese Laid-open Patent Publication No. 2006-033348
Patent Document 3: Japanese Laid-open Patent Publication No. 06-276207

SUMMARY

According to an aspect of an embodiment of the invention, a transmission apparatus includes a receiver circuit that receives a packet from a ring network; a determination circuit that determines whether the packet received by the receiver circuit is addressed to a local network; a storage that can store the packet addressed to the local network; a detection circuit that detects that the memory capacity of the storage is the maximum; and a transmitter circuit that sends the packet to the ring network if the determination circuit determines that the packet is addressed to the local network and if the detection circuit detects that the memory capacity of the storage is the maximum.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments. Moreover, the embodiments can be suitably combined as long as there is no contradiction in the content.

[a] First Embodiment

Figure 1:
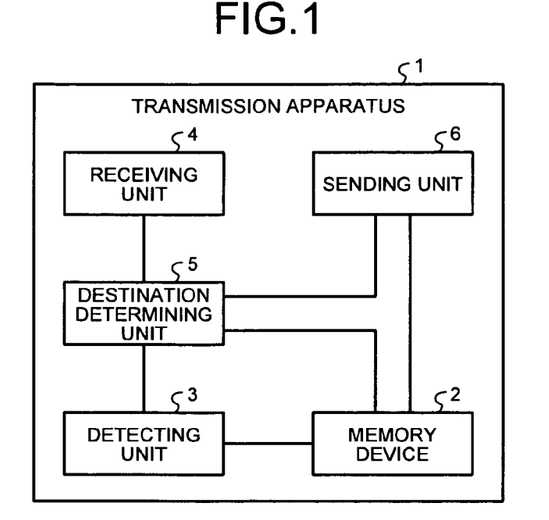
FIG. 1 is a schematic diagram of a configuration example of a transmission apparatus according to a first embodiment of the present invention.

Explained below is a configuration example of a transmission apparatus according to a first embodiment of the present invention. FIG. 1 is a schematic diagram of a configuration example of the transmission apparatus according to the first embodiment. For example, as illustrated in FIG. 1, a transmission apparatus 1 includes a memory device 2, a detecting unit 3, a receiving unit 4, a destination determining unit 5, and a sending unit 6. Moreover, for example, the transmission apparatus 1 is one of a plurality of transmission apparatuses constituting a ring network and sits on top of a local network.

In the abovementioned configuration, the memory device 2 is a buffer memory or the like that is used for storing packets addressed to the local network established under the transmission apparatus 1. The detecting unit 3 detects when the memory capacity of the memory device 2 has approached the maximum and informs the destination determining unit 5 about the same. The receiving unit 4 receives packets from the ring network and outputs them to the destination determining unit 5.

The destination determining unit 5 determines whether a packet received from the receiving unit 4 is addressed to the local network. Besides, the destination determining unit 5 also receives the detection result from the detecting unit 3. If the packet is addressed to the local network and if free space is available in the memory device 2, then the destination determining unit 5 stores that packet in the memory device 2. Later, the sending unit 6 sends the packet that has been stored in the memory device 2 to the specified address in the local network.

On the other hand, if the packet is addressed to the local network but if the memory capacity of the memory device 2 has approached the maximum, then the destination determining unit 5 outputs the packet to the sending unit 6. When the destination determining unit 5 has determined that the packet is addressed to the local network and when the detecting unit 3 has detected that the memory capacity of the memory device 2 has approached the maximum, the sending unit 6 sends the packet over the ring network. Meanwhile, in the case when a packet is not addressed to the local network established under the transmission apparatus 1, the destination determining unit 5 outputs the packet to the sending unit 6, which then resends the packet over the ring network.

In this way, in the memory full state of a memory device such as a buffer memory, the transmission apparatus 1 sends over the ring network a packet that has actually been addressed to the local network established under the transmission apparatus 1. As a result, as compared to the conventional technology of installing additional equipment or restricting the inward traffic of packets, the transmission apparatus 1 is able to prevent degradation of transmission efficiency and reliability of the packets being transmitted in the ring network.

[b] Second Embodiment

Configuration of Ring Network

Figure 2:
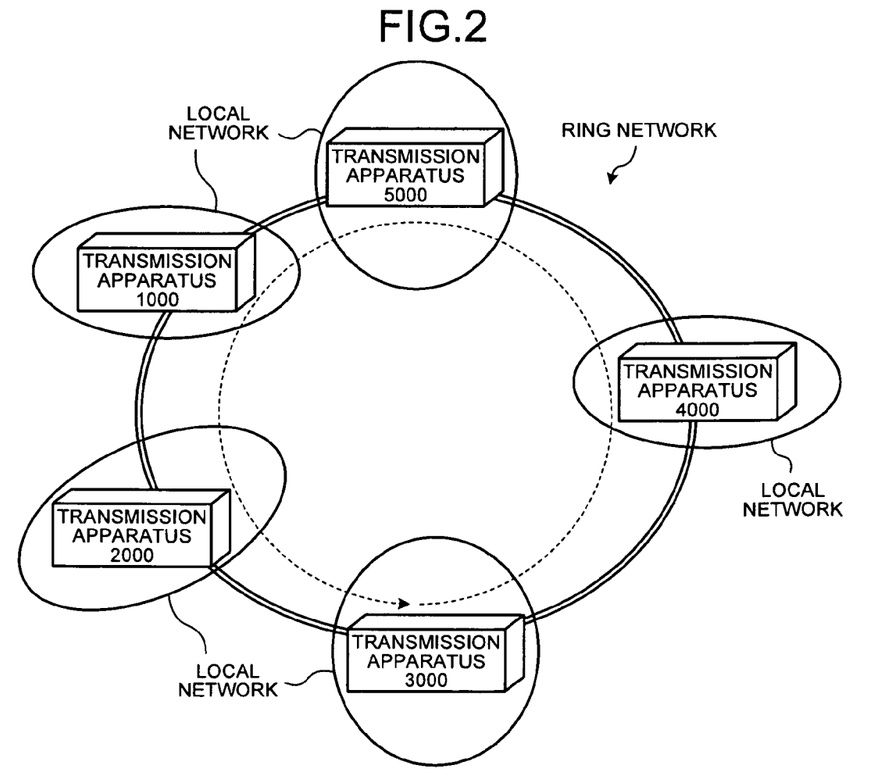
FIG. 2 is a schematic diagram of a configuration example of a ring network.

Explained below with reference to FIG. 2 is a configuration of a ring network. FIG. 2 is a schematic diagram of a configuration example of a ring network. For example, in the ring network illustrated in FIG. 2, transmission apparatuses 1000, 2000, 3000, 4000, and 5000 are interconnected by a bus. Herein, in the ring network, it is assumed that the packets are transmitted in the direction illustrated by a dashed arrow. Meanwhile, the number of transmission apparatus constituting the ring network is not limited to five.

Herein, each transmission apparatus sits on top of a separate local network. In each local network are installed a plurality of devices that receive the packets sent by the corresponding transmission apparatus. Meanwhile, each transmission apparatus can be kept in the duplexed state and, in that case, an operating transmission apparatus and a backup transmission apparatus are configured.

Regarding the abovementioned configuration, following is the explanation of a case when a packet sent by a device constituting the local network established under the transmission apparatus 3000 is sent to a device constituting the local network established under the transmission apparatus 1000. Herein, for example, the transmission apparatus 3000 transmits a packet to the transmission apparatus 1000 via the transmission apparatuses 4000 and 5000 that also constitute the ring network.

The transmission apparatus 1000 receives a packet addressed to a device constituting the local network established under the transmission apparatus 1000. However, if the corresponding buffer memory is in the memory full state; then, instead of importing the received packet, the transmission apparatus 1000 sends the packet to the transmission apparatus 2000. On the other hand, if free buffer memory is available, then the transmission apparatus 1000 imports the received packet and sends it to the destination device constituting the corresponding local network.

Thus, until the corresponding buffer memory recovers from the memory full state and until the packet can be sent to a device constituting the corresponding local network, the transmission apparatus 1000 makes the packet keep on circulating in the ring network. Meanwhile, the abovementioned operations performed by the transmission apparatus 1000 are also performed by the other transmission apparatuses in an identical manner.

Configuration of Transmission Apparatus According to Second Embodiment

Figure 3:
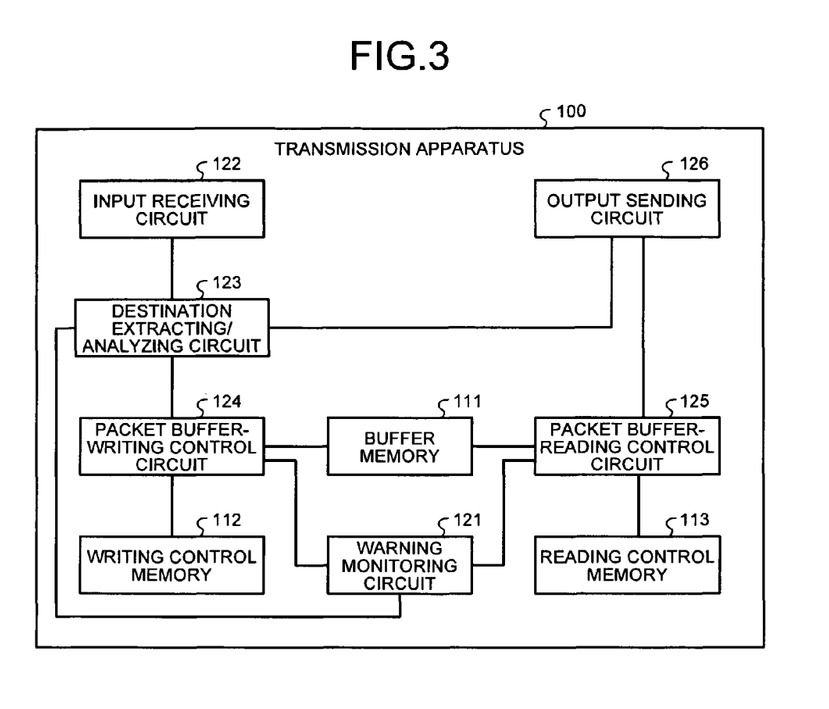
FIG. 3 is a schematic diagram of a configuration example of a transmission apparatus according to a second embodiment of the present invention.

Explained below with reference to FIG. 3 is a configuration of a transmission apparatus according to the second embodiment. FIG. 3 is a schematic diagram of a configuration example of a transmission apparatus according to the second embodiment.

For example, as illustrated in FIG. 3, a transmission apparatus 100 includes a buffer memory 111, a writing control memory 112, and a reading control memory 113. Besides, the transmission apparatus 100 also includes a warning monitoring circuit 121, an input receiving circuit 122, an address extracting/analyzing circuit 123, a packet buffer-writing control circuit 124, a packet buffer-reading control circuit 125, and an output sending circuit 126. Meanwhile, the transmission apparatus 100 is an example of the transmission apparatus 1 or the transmission apparatus 1000.

The buffer memory 111 is, for example, a semiconductor memory element such as a flash memory. Each of the writing control memory 112 and the reading control memory 113 is, for example, a semiconductor memory element such as a random access memory (RAM) or a read only memory (ROM), or a memory device such as a hard disk or an optical disk.

Each circuit from among the warning monitoring circuit 121 to the output sending circuit 126 is, for example, an integrated circuit such as an application specific integrated circuit (ASIC) or a field programmable gate array (FPGA). Alternatively, each circuit from among the warning monitoring circuit 121 to the output sending circuit 126 can be, for example, an electronic circuit such as a central processing unit (CPU) or a micro processing unit (MPU).

In the abovementioned configuration, the buffer memory 111 stores, for example, the packets addressed to a local network established under the transmission apparatus 100. The writing control memory 112 holds, for example, the information controlled by the packet buffer-writing control circuit 124. The reading control memory 113 holds, for example, the information controlled by the packet buffer-reading control circuit 125. Meanwhile, the buffer memory 111 is an example of the memory device 2 according to the first example.

The warning monitoring circuit 121 receives, for example, from the packet buffer-writing control circuit 124 and/or the packet buffer-reading control circuit 125 a warning indicating that the buffer memory 111 is in the memory full state. Subsequently, the warning monitoring circuit 121 informs the address extracting/analyzing circuit 123 about the same warning indicating that the buffer memory 111 is in the memory full state. Meanwhile, the warning monitoring circuit 121 is an example of the detecting unit 3 according to the first embodiment.

The input receiving circuit 122 receives, for example, packets from the ring network and then outputs the received packets to the address extracting/analyzing circuit 123. Meanwhile, the input receiving circuit 122 is an example of the receiving unit 4 according to the first embodiment.

The address extracting/analyzing circuit 123 receives, for example, a warning from the warning monitoring circuit 121. Besides, for example, based on the frame information that is included in a packet and output by the input receiving circuit 122, the address extracting/analyzing circuit 123 determines whether that packet is addressed to a device constituting the local network established under the transmission apparatus 100. More specifically, the address extracting/analyzing circuit 123 extracts the destination address specified in the frame and determines whether that packet is addressed to a device constituting the local network established under the transmission apparatus 100.

If the packet is addressed to a device constituting the local network established under the transmission apparatus 100 and if a warning is received from the warning monitoring circuit 121, then the address extracting/analyzing circuit 123 sends that packet to the output sending circuit 126. On the other hand, if the packet is addressed to a device constituting the local network established under the transmission apparatus 100 but if no warning is received from the warning monitoring circuit 121, then the address extracting/analyzing circuit 123 outputs the packet to the packet buffer-writing control circuit 124. Meanwhile, the address extracting/analyzing circuit 123 is an example of the destination determining unit 5.

Figure 4:
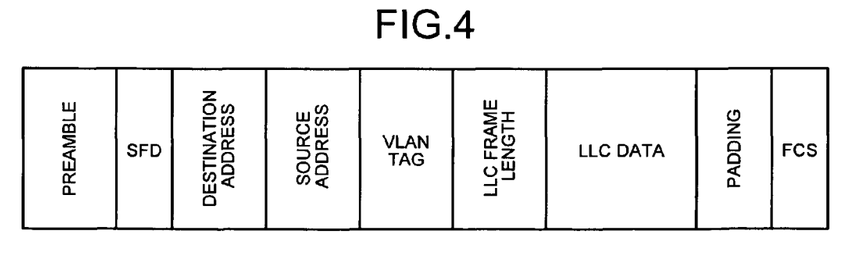
FIG. 4 is an illustrative diagram of an exemplary frame format of a packet according to the second embodiment.

Given below with reference to FIG. 4 is the explanation regarding the frame information. FIG. 4 is an illustrative diagram of an exemplary frame format of a packet according to the second embodiment. Herein, the frame format illustrated in FIG. 4 is made compatible to the IEEE802.1Q standard by appending a VLAN tag (VLAN stands for virtual local area network) to a frame format in the IEEE802.3 standard.

For example, as illustrated in FIG. 4, the frame of a packet includes a preamble, a start frame delimiter (SFD), a destination address, a source address, and a VLAN tag, an LLC frame length (LLC stands for logical link control), LLC data, a padding, and a frame check sequence (FCS).

Herein, the preamble is a signal that indicates the start of packet transmission in each transmission apparatus connected by the bus to constitute the ring network and that provides the timing for synchronization. The SFD indicates, for example, the start position of the destination address field. The destination address indicates, for example, the address of the device specified as the destination of the packet.

The source address indicates, for example, the address of the source device that has transmitted the packet. The VLAN tag is used in, for example, identifying the VLAN in each transmission apparatus. The LLC frame length and the LLC data are, for example, fields related to error control and frame control in the ring network. The padding is, for example, a blank field. The FCS is used, for example, to check for errors during packet transmission in each field, namely, the destination address, the source address, the LLC frame length, and the LLC data.

Returning to the explanation with reference to FIG. 3, the packet buffer-writing control circuit 124 stores, for example, the packet output by the address extracting/analyzing circuit 123 in the buffer memory 111. At that time, the packet buffer-writing control circuit 124 stores the packet in the buffer memory 111 while controlling the control information regarding the source address, the VLAN information, the LLC frame length, and the FCS. Besides, the packet buffer-writing control circuit 124 stores the control information in the writing control memory 112. Moreover, for example, when the buffer memory 111 goes in the memory full state, the packet buffer-writing control circuit 124 sends to the warning monitoring circuit 121 a warning indicating that the buffer memory 111 is in the memory full state.

Based on the result controlled by the packet buffer-writing control circuit 124, the packet buffer-reading control circuit 125 reads the packets in consecutive order from the buffer memory 111, appends control information to the packets, and then outputs the packets to the output sending circuit 126. Besides, the packet buffer-reading control circuit 125 stores the control information in the reading control memory 113. Moreover, for example, when the buffer memory goes in the memory full state, the packet buffer-reading control circuit 125 sends to the warning monitoring circuit 121 a warning indicating that the buffer memory 111 is in the memory full state.

The output sending circuit 126 sends, for example, the packets output by the address extracting/analyzing circuit 123 over the ring network. Moreover, the output sending circuit 126 sends, for example, the packets that have been read by the packet buffer-reading control circuit 125 from the buffer memory 111 to the destination device constituting the corresponding local network. Meanwhile, the output sending circuit 126 is an example of the sending unit 6.

Packet Pass-Through Process According to Second Embodiment

Figure 5:
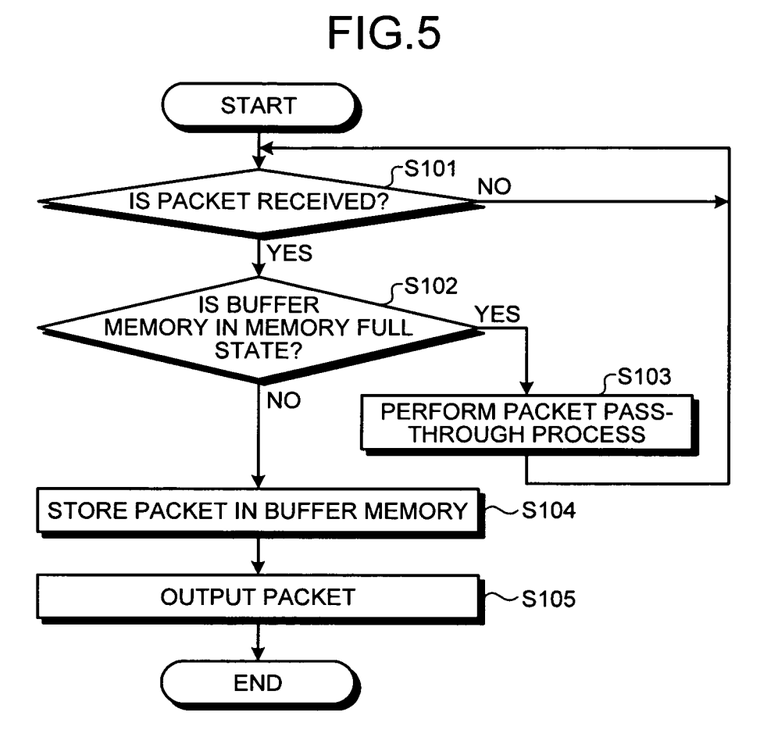
FIG. 5 is a flowchart for explaining a packet pass-through process according to the second embodiment.

Explained below with reference to FIG. 5 is a packet pass-through process according to the second embodiment. FIG. 5 is a flowchart for explaining the packet pass-through process according to the second embodiment. Herein, the packet pass-through process is an operation performed when a packet addressed to the local network established under the transmission apparatus 100 is received from the ring network.

For example, as illustrated in FIG. 5, when a packet addressed to the local network established under the transmission apparatus 100 is received from the ring network (Yes at Step S101), the transmission apparatus 100 determines whether the buffer memory 111 is in the memory full state (Step S102). On the other hand, when no packet is received from the ring network (No at Step S101), the transmission apparatus 100 waits for the reception of a packet.

If the buffer memory 111 is in the memory full state (Yes at Step S102), then the transmission apparatus 100 sends the received packet over the ring network as the packet pass-through process (Step S103). Herein, in order to determine whether the buffer memory 111 is in the memory full state, a warning from the warning monitoring circuit 121 is referred to. Once the packet pass-through process is complete, the transmission apparatus 100 returns to Step S101.

Meanwhile, if the buffer memory 111 is not in the memory full state (No at Step S102), the transmission apparatus 100 stores the received packet in the buffer memory 111 (Step S104). Subsequently, the transmission apparatus 100 reads the packet stored in the buffer memory 111 and sends it to a device specified as the destination address in the corresponding local network (Step S105).

Effect of Second Embodiment

As described above, until the buffer memory 111 recovers from the memory full state, the transmission apparatus 100 keeps sending the received packets over the ring network. As a result, it becomes possible to prevent degradation of transmission efficiency and reliability of the packets being transmitted in the ring network. In other words, even if the buffer memory 111 is in the memory full state; since the transmission apparatus 100 does not control the transmission band, it becomes possible to prevent degradation of transmission efficiency without affecting the line speed of the ring network.

Besides, as compared to the conventional technology of processing packets by installation of additional memory, duplexing of apparatuses, or installation of additional circuits; the transmission apparatus 100 is able to process the packets in an inexpensive manner. Moreover, since the transmission apparatus 100 eliminates the need for installing additional equipment, the failure rate can be prevented from increasing and the packets can be processed using a downsized configuration.

[c] Third Embodiment

In the second embodiment, the explanation is given for the case in which the packet pass-through process is performed when the buffer memory 111 is in the full state. In addition to that, it is also possible to perform the packet pass-through process based on the information indicating whether a packet is of importance. Therein, in a third embodiment of the present invention, the explanation is given for the case in which the packet pass-through process is performed based on the information indicating whether a packet is of importance.

Configuration of Transmission Apparatus According to Third Embodiment

Figure 6:
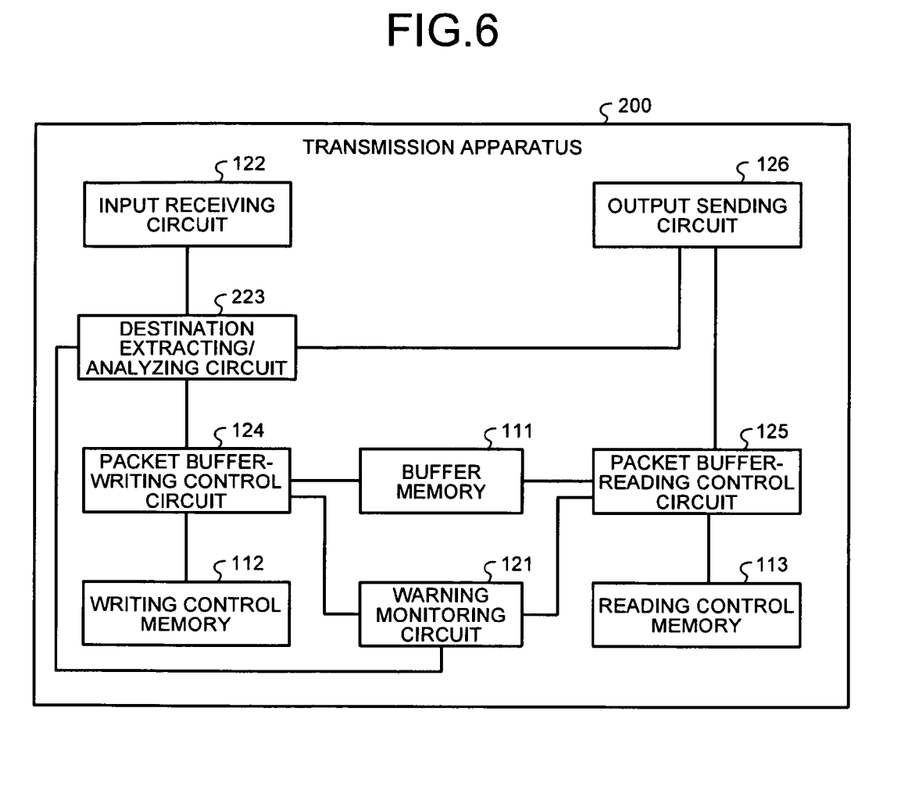
FIG. 6 is a schematic diagram of a configuration example of a transmission apparatus according to a third embodiment of the present invention.

Explained below with reference to FIG. 6 is a configuration of a transmission apparatus according to the third embodiment. FIG. 6 is a schematic diagram of a configuration example of a transmission apparatus according to the third embodiment. In FIG. 6, the constituent elements having the same configuration or functions as the constituent elements described in the transmission apparatus 100 according to the second embodiment are referred to by the same reference numbers. In the following description, the operations identical to those performed in the transmission apparatus 100 according to the second embodiment are not repeatedly explained. Instead, only the peculiar operations performed by an address extracting/analyzing circuit 223 are explained.

For example, as illustrated in FIG. 6, a transmission apparatus 200 includes the buffer memory 111, the writing control memory 112, and the reading control memory 113. Besides, the transmission apparatus 200 includes the warning monitoring circuit 121, the input receiving circuit 122, the address extracting/analyzing circuit 223, the packet buffer-writing control circuit 124, the packet buffer-reading control circuit 125, and the output sending circuit 126.

The address extracting/analyzing circuit 223 receives, for example, a warning from the warning monitoring circuit 121. Besides, for example, based on the frame information that is included in a packet and output by the input receiving circuit 122, the address extracting/analyzing circuit 223 determines whether that packet is addressed to a device constituting the local network established under the transmission apparatus 200. More specifically, the address extracting/analyzing circuit 223 extracts the destination address specified in the frame and determines whether that packet is addressed to a device constituting the local network established under the transmission apparatus 200.

If the packet is addressed to a device constituting the local network established under the transmission apparatus 200, then the address extracting/analyzing circuit 223 determines whether a warning is received from the warning monitoring circuit 121. If a warning is received from the warning monitoring circuit 121 and if the information included in the frame of the packet indicates that the packet is of importance, then the address extracting/analyzing circuit 223 outputs the packet to the output sending circuit 126.

On the other hand, if a warning is received from the warning monitoring circuit 121 and if the information included in the frame of the packet indicates that the packet is not of importance, then the address extracting/analyzing circuit 223 destroys the packet. Meanwhile, if no warning is received from the warning monitoring circuit 121, then the address extracting/analyzing circuit 223 outputs the packet to the packet buffer-writing control circuit 124.

Figure 7A:
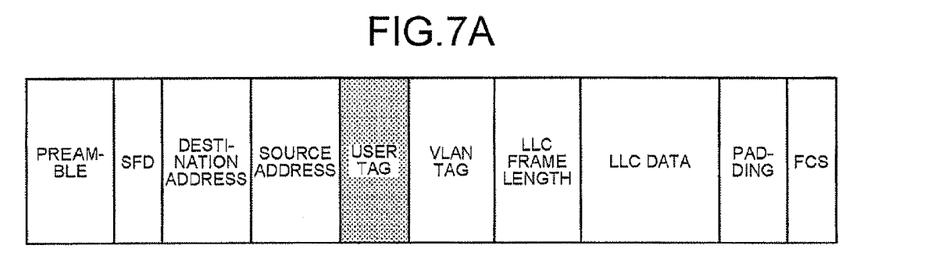
FIG. 7A is an illustrative diagram of an exemplary frame format of a packet according to the third embodiment.
Figure 7B:
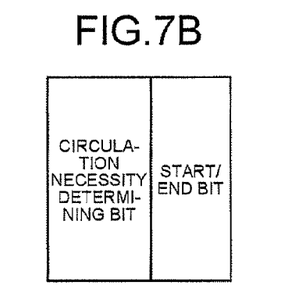
FIG. 7B illustrates a detailed example of a user tag according to the third embodiment.

Given below with reference to FIGS. 7A and 7B is the explanation regarding the frame information. FIG. 7A is an illustrative diagram of an exemplary frame format of a packet according to the third embodiment. FIG. 7B illustrates a detailed example of a user tag according to the third embodiment. Herein, the frame format illustrated in FIG. 7A has a user tag appended thereto so as to enable addition of functions that are unique to the third embodiment.

For example, as illustrated in FIG. 7A, the frame of a packet includes a preamble, an SFD, a destination address, a source address, a user tag, a VLAN tag, an LLC frame length, LLC data, a padding, and an FCS. Herein, in the third embodiment, the fields other than the user tag are identical to the fields in the second embodiment. Hence, the explanation thereof is not repeated.

Regarding a packet received from the ring network, the user tag holds, for example, the information used in determining whether the packet pass-through process needs to be performed. As illustrated in FIG. 7B, the user tag includes, for example, a circulation necessity determining bit and a start/end bit.

The circulation necessity determining bit is, for example, 1-bit information indicating whether the received packet is a high-quality packet. When the packet is a high-quality packet, the circulation necessity determining bit holds "1"; and when the packet is not a high-quality packet, the circulation necessity determining bit holds "0". Herein, a high-quality packet points to a picture packet or an audio packet that preferably is to be prevented from being destroyed. In contrast, a low-quality packet can be destroyed and then have it resent.

The start/end bit is, for example, 1-bit information for ensuring that, when the transmission apparatus 200 performs the packet pass-through process, the order of operations on the packet made to circulate in the ring network is not reversed. When a packet is sent, the start/end bit holds "0" as the default value; and when that packet reaches a device that is specified as the destination address in the corresponding local network, the start/end bit is updated to "1". Thus, the transmission apparatus monitors the start/end bit and, every time the start/end bit is found to be updated to "1", recognizes the start/end of transmission. Meanwhile, this operation is performed by, for example, the address extracting/analyzing circuit 223.

Packet Pass-Through Process According to Third Embodiment

Figure 8:
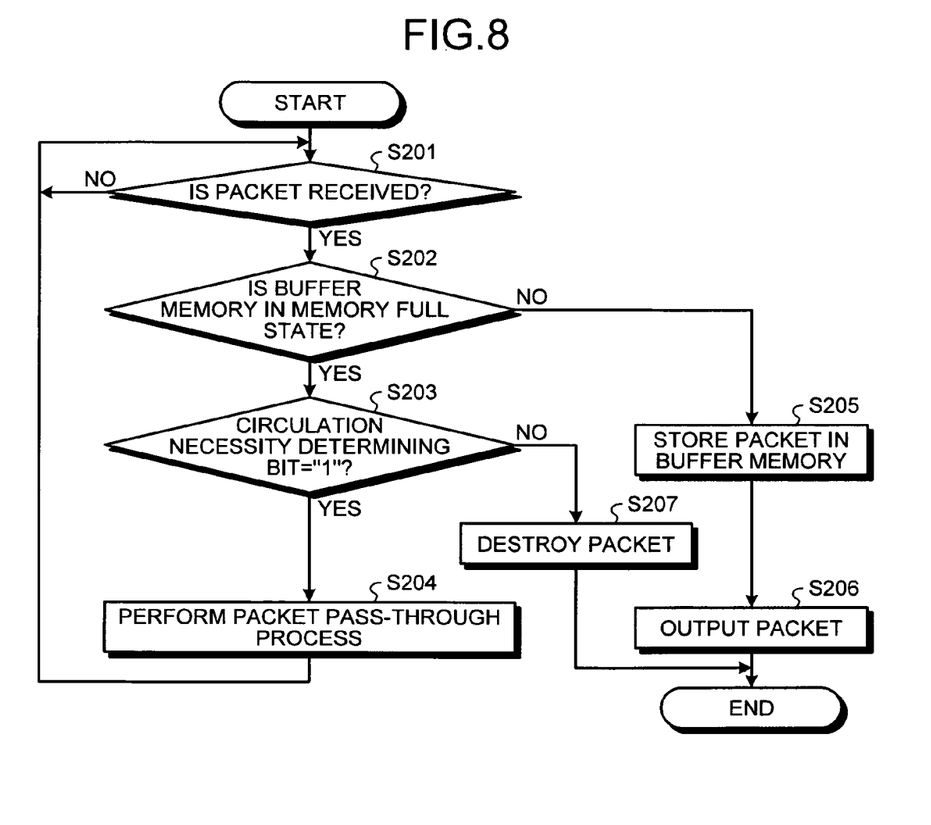
FIG. 8 is a flowchart for explaining a packet pass-through process according to the third embodiment.

Explained below with reference to FIG. 8 is a packet pass-through process according to the third embodiment. FIG. 8 is a flowchart for explaining the packet pass-through process according to the third embodiment. Herein, the packet pass-through process is an operation performed when a packet addressed to the local network established under the transmission apparatus 200 is received from the ring network. Meanwhile, with reference to FIG. 8, the packet pass-through process is explained while omitting the explanation regarding the operation using the start/end bit.

For example, as illustrated in FIG. 8, when a packet addressed to the local network established under the transmission apparatus 200 is received from the ring network (Yes at Step S201), the transmission apparatus 200 determines whether the buffer memory 111 is in the memory full state (Step S202). On the other hand, when no packet is received from the ring network (No at Step S201), the transmission apparatus 200 waits for the reception of a packet.

If the buffer memory 111 is in the memory full state (Yes at Step S202), then the transmission apparatus 200 determines whether the circulation necessity determining bit is holding "1" (Step S203). If the circulation necessity determining bit is holding "1" (Yes at Step S203), then the transmission apparatus 200 sends the received packet over the ring network as the packet pass-through process (Step S204).

Meanwhile, if the buffer memory 111 is not in the memory full state (No at Step S202), the transmission apparatus 200 stores the received packet in the buffer memory 111 (Step S205). Subsequently, the transmission apparatus 200 reads the packet stored in the buffer memory 111 and sends it to a device specified as the destination address in the corresponding local network (Step S206).

If the circulation necessity determining bit is holding "0" (No at Step S203), the transmission apparatus 200 destroys the received packet (Step S207) and ends the process. Thus, when the buffer memory 111 is in the memory full state, the transmission apparatus 200 performs the packet pass-through process with the aim of sending the packets of high importance to a device specified as the destination address in the corresponding local network, and destroys the packets of low importance.

Effect of Third Embodiment

As described above, the transmission apparatus 200 performs the packet pass-through process regarding the packets of high importance while destroying the packets of low importance. Hence, the packets can be processed while minimizing the adverse effects on the transmission quality in the ring network.

[d] Fourth Embodiment

In the third embodiment, the explanation is given for the case in which the packet pass-through process is performed based on the degree of importance of each packet. In addition to that, it is also possible to perform the packet pass-through process based on the number of times for which a packet is allowed to circulate in the ring network. Therein, in a fourth embodiment of the present invention, the explanation is given for the case in which the packet pass-through process is performed based on the number of times for which a packet is allowed to circulate in the ring network.

Configuration of Transmission Apparatus According to Fourth Embodiment

Figures 9, 10:
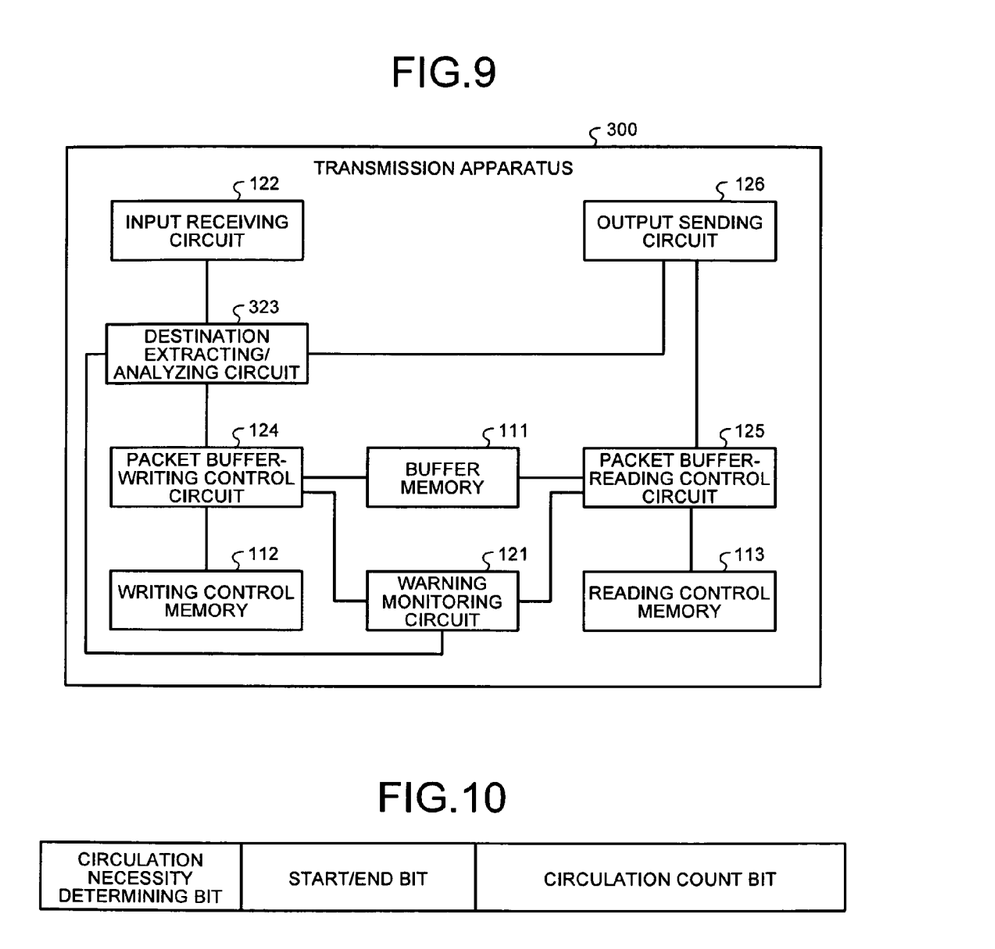
FIG. 9 is a schematic diagram of a configuration example of a transmission apparatus according to a fourth embodiment of the present invention.
FIG. 10 illustrates a detailed example of a user tag according to the fourth embodiment.

Explained below with reference to FIG. 9 is a configuration of a transmission apparatus according to the fourth embodiment. FIG. 9 is a schematic diagram of a configuration example of a transmission apparatus according to the fourth embodiment. In FIG. 9, the constituent elements having the same configuration or functions as the constituent elements described in the transmission apparatus 100 according to the second embodiment are referred to by the same reference numbers. In the following description, the operations identical to those performed in the transmission apparatus 100 according to the second embodiment are not repeatedly explained. Instead, only the peculiar operations performed by an address extracting/analyzing circuit 323 are explained.

For example, as illustrated in FIG. 9, a transmission apparatus 300 includes the buffer memory 111, the writing control memory 112, and the reading control memory 113. Besides, the transmission apparatus 300 includes the warning monitoring circuit 121, the input receiving circuit 122, the address extracting/analyzing circuit 323, the packet buffer-writing control circuit 124, the packet buffer-reading control circuit 125, and the output sending circuit 126.

The address extracting/analyzing circuit 323 receives, for example, a warning from the warning monitoring circuit 121. Besides, for example, based on the frame information that is included in a packet and output by the input receiving circuit 122, the address extracting/analyzing circuit 323 determines whether that packet is addressed to a device constituting the local network established under the transmission apparatus 300. More specifically, the address extracting/analyzing circuit 323 extracts the destination address specified in the frame and determines whether that packet is addressed to a device constituting the local network established under the transmission apparatus 300.

If the packet is addressed to a device constituting the local network established under the transmission apparatus 300, then the address extracting/analyzing circuit 323 determines whether a warning is received from the warning monitoring circuit 121. If a warning is received from the warning monitoring circuit 121, then the address extracting/analyzing circuit 323 refers to the information included in the frame of the packet and determines whether that packet is of importance.

If that packet is determined to be of importance, the address extracting/analyzing circuit 323 determines whether the packet is allowed to circulate in the ring network. If the packet is determined to be allowed to circulate in the ring network, then the address extracting/analyzing circuit 323 outputs the packet to the output sending circuit 126.

Meanwhile, if that packet is determined to be not of importance, then the address extracting/analyzing circuit 323 destroys the packet. Similarly, if the packet is determined to be not allowed to circulate in the ring network, then the address extracting/analyzing circuit 323 destroys the packet. Moreover, if no warning is received from the warning monitoring circuit 121, then the address extracting/analyzing circuit 323 outputs the packet to the packet buffer-writing control circuit 124.

Explained below with reference to FIG. 10 is a user tag according to the fourth embodiment. FIG. 10 illustrates a detailed example of a user tag according to the fourth embodiment. Meanwhile, since the frame format according to the fourth embodiment is identical to that according to the third embodiment, the explanation thereof is not repeated.

As illustrated in FIG. 10, the user tag includes, for example, a circulation necessity determining bit, a start/end bit, and a circulation count bit. Herein, the circulation necessity determining bit and the start/end bit according to the fourth embodiment hold identical information to that held in the third embodiment. Hence, the explanation thereof is not repeated.

The circulation count bit is, for example, 3-bit information indicating the number of times for which a packet circulates in the ring network. When a packet is not to be circulated, the circulation count bit holds "0"; while when a packet is allowed to circulate for three times, the circulation count bit holds "3". When a packet reaches a device specified as the destination address in the corresponding local network, the circulation count bit is decremented by a single count. Meanwhile, this operation is performed by, for example, the address extracting/analyzing circuit 323.

Packet Pass-Through Process According to Fourth Embodiment

Figure 11:
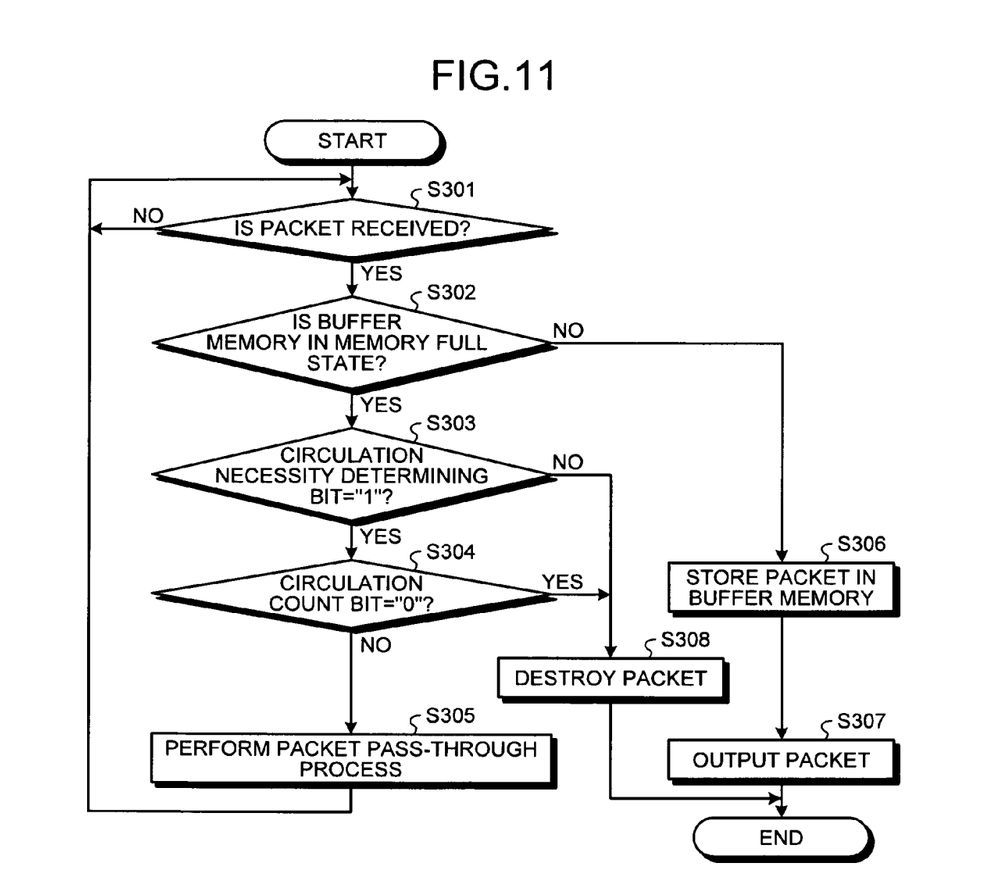
FIG. 11 is a flowchart for explaining a packet pass-through process according to the fourth embodiment.

Explained below with reference to FIG. 11 is a packet pass-through process according to the fourth embodiment. FIG. 11 is a flowchart for explaining the packet pass-through process according to the fourth embodiment. Herein, the packet pass-through process is an operation performed when a packet addressed to the local network established under the transmission apparatus 300 is received from the ring network. Meanwhile, with reference to FIG. 11, the packet pass-through process is explained while omitting the explanation regarding the operation using the start/end bit.

For example, as illustrated in FIG. 11, when a packet addressed to the local network established under the transmission apparatus 300 is received from the ring network (Yes at Step S301), the transmission apparatus 300 determines whether the buffer memory 111 is in the memory full state (Step S302). On the other hand, when no packet is received from the ring network (No at Step S301), the transmission apparatus 300 waits for the reception of a packet.

If the buffer memory 111 is in the memory full state (Yes at Step S302), then the transmission apparatus 300 determines whether the circulation necessity determining bit is holding "1" (Step S303). If the circulation necessity determining bit is holding "1" (Yes at Step S303), then the transmission apparatus 300 determines whether the circulation count bit is holding "0" (Step S304). If the circulation count bit is not holding "0" (No at Step S304), the transmission apparatus 300 sends the received packet over the ring network as the packet pass-through process (Step S305).

Meanwhile, if the buffer memory 111 is not in the memory full state (No at Step S302), the transmission apparatus 300 stores the received packet in the buffer memory 111 (Step S306). Subsequently, the transmission apparatus 300 reads the packet stored in the buffer memory 111 and sends it to a device specified as the destination address in the corresponding local network (Step S307).

Moreover, if the circulation necessity determining bit is holding "0" (No at Step S303), then the transmission apparatus 200 destroys the received packet (Step S308) and ends the process. Similarly, if the circulation count bit is holding "0" (Yes at Step S304), then the transmission apparatus 300 destroys the received packet (Step S308) and ends the process.

Effect of Fourth Embodiment

As described above, the transmission apparatus 300 sets the number of times for which a packet is allowed to circulate in the ring network. Hence, the packets can be processed while preventing a situation in which a packet keeps almost permanently circulating in the ring network.

For example, in case the transmission apparatus 300 starts malfunctioning, then it becomes unable to output the packets. In that case, there is a possibility that the buffer memory 111 cannot recover from the memory full state. At that time, due to the malfunctioning of the transmission apparatus 300, it is conceivable that crossed lines occur in the ring network. With regard to that issue, the transmission apparatus 300 makes use of the circulation count bit and, every time a packet passes therethrough, decrements the circulation count bit by a single count. Moreover, when the circulation count bit decreases to "0", the transmission apparatus 300 destroys the corresponding packet. That enables achieving reduction in the processing load on the ring network. Moreover, for example, if a large value is set in the circulation count bit, the transmission apparatus 300 recognizes that the corresponding packet is of high priority and high importance. Thus, the packets can be processed while differentiating their quality classes.

[e] Fifth Embodiment

Apart from the abovementioned embodiments of the present invention, the present invention can also be implemented by using various other embodiments. Herein, other embodiments are explained by dividing the description into (1) blocking point, (2) system configuration, and (3) program.

(1) Blocking Point

Figure 12:
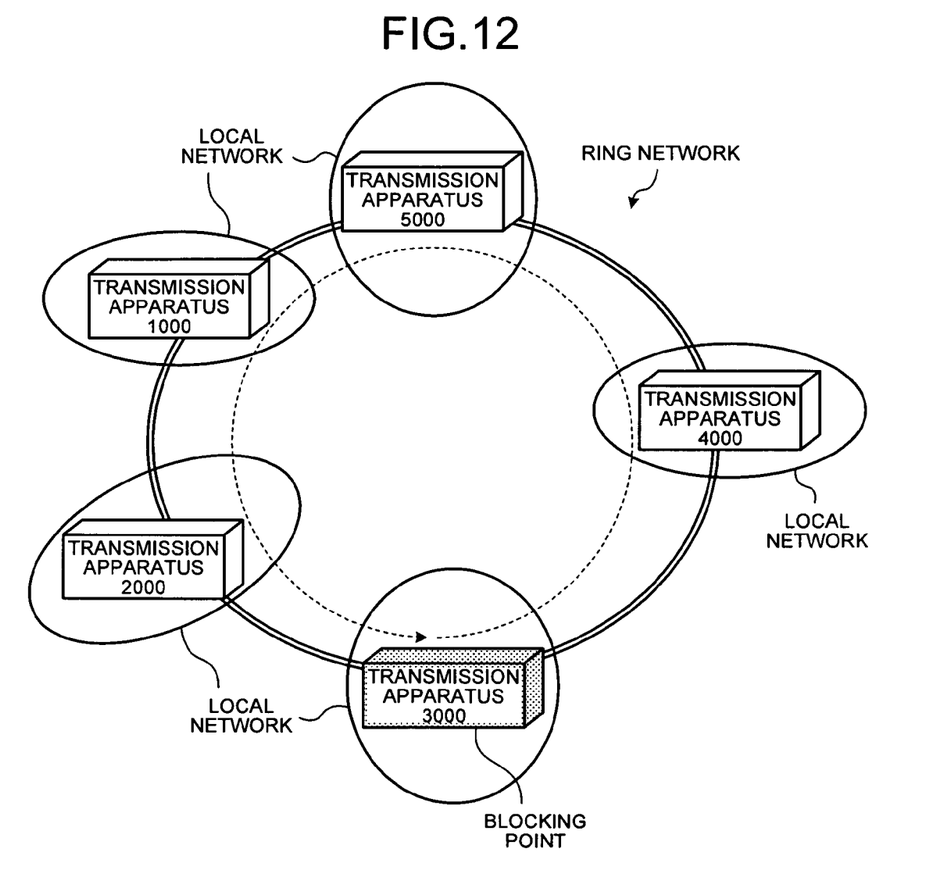
FIG. 12 is an illustrative diagram of a configuration example of a ring network including a blocking point.

In the embodiments described above, while the packets are circulated in the ring network, the task of destroying the packets is performed in each transmission apparatus. Thus, each transmission apparatus assumes the role of a blocking point. However, in the conventional technology, a blocking point is configured to destroy packets without allowing the packets to circulate. Therein, with reference to FIG. 12, a ring network is explained that includes the transmission apparatuses as disclosed herein and includes a single blocking point. FIG. 12 is an illustrative diagram of a configuration example of a ring network including a blocking point.

For example, in the ring network illustrated in FIG. 12, the transmission apparatuses 1000, 2000, 3000, 4000, and 5000 are interconnected by a bus. Herein, in the ring network, it is assumed that the packets are transmitted in the direction illustrated by a dashed arrow. Meanwhile, the number of transmission apparatus constituting the ring network is not limited to five.

Herein, each transmission apparatus sits on top of a separate local network. In each local network are installed a plurality of devices that receive the packets sent by the corresponding transmission apparatus. Meanwhile, each transmission apparatus can be kept in the duplexed state and, in that case, an operating transmission apparatus and a backup transmission apparatus are configured.

Regarding the abovementioned configuration, following is the explanation of a case when the transmission apparatus 3000 assumes the role of a blocking point. Apart from the transmission apparatus 3000, the other transmission apparatuses performs the operations described in the abovementioned embodiments and, for example, do not destroy high-quality packets of the highest priority so as to allow those packets to circulate in the ring network.

Consider a case when the operations performed by a blocking point in the conventional technology are to be given the priority. In that case, as one method, the transmission apparatus 3000 functioning as the blocking point forcibly destroys the packets without referring to the information in the respective user tags. As another method, if the circulation necessity determining bit holds "1" (indicating high quality), then the corresponding packet is not destroyed in the blocking point. Meanwhile, along with having a blocking point, a combination of a variety of information of the user tag can also be maintained.

(2) System Configuration

The processing procedures, the control procedures, specific names, various data, and information containing a variety of data and parameters (e.g., the frame format of a packet) described in the embodiments or illustrated in the drawings can be changed as required unless otherwise specified. Thus, the frame format of a packet can be set in such a way that the user tag includes only the circulation necessity determining bit, only the start/end bit, only the circulation count bit, or a combination of those bits. Moreover, the bit counts of a variety of information in the user tag are not limited to the above-mentioned bit counts.

The constituent elements of the transmission apparatus 100 or the like illustrated in the drawings are merely conceptual, and need not be physically configured as illustrated. The constituent elements, as a whole or in part, can be separated or integrated either functionally or physically based on various types of loads or use conditions. For example, the address extracting/analyzing circuit 123 can be separated into an "address extracting unit" for extracting the destination address, a "circulation necessity determining unit" for determining whether circulation of a packet is necessary, and a "circulation count determining unit" for determining the circulation count.

(3) Program

Figure 13:
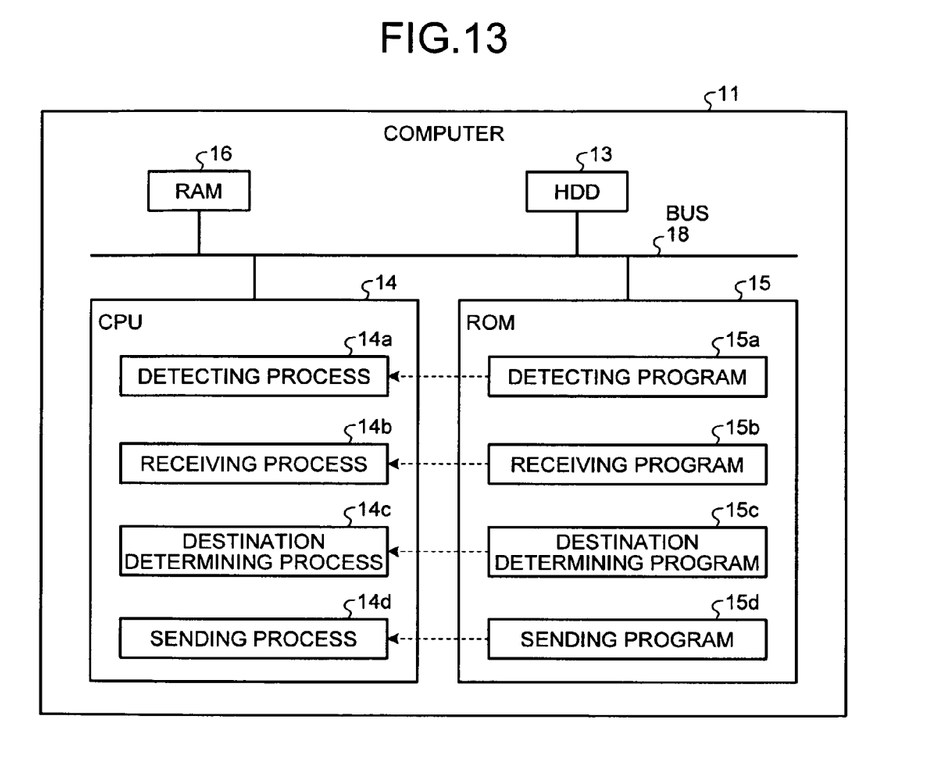
FIG. 13 is an exemplary block diagram of a computer that executes a transmission program.

Meanwhile, in the abovementioned embodiments, the explanation is given for the case when various operations are implemented with the use of hardware logic. However, the present invention is not limited to that case and can be implemented by executing a program that is written in advance in a computer. Explained below with reference to FIG. 13 is an exemplary block diagram of a computer that executes a transmission program having identical functions to those of the transmission apparatus 1 according to the first embodiment. FIG. 13 is a block diagram of a computer that executes a transmission program.

As illustrated in FIG. 13, a computer 11 functioning as the transmission apparatus 1 includes an HDD 13, a CPU 14, a ROM 15, and a RAM 16 that are interconnected by a bus 18.

In the ROM 15 is stored in advance a transmission program performing identical functions to those of the transmission apparatus 1 according to the first embodiment. More particularly, as illustrated in FIG. 13, in the ROM 15 are stored in advance a detecting program 15a, a receiving program 15b, an destination determining program 15c, and a sending program 15d. These programs 15a to 15d can be appropriately integrated or separated in an identical manner to the constituent elements of the transmission apparatus 1 illustrated in FIG. 1.

The CPU 14 reads the programs 15a to 15d from the ROM 15 and executes them so that, as illustrated in FIG. 13, the programs 15a to 15d respectively function as a detecting process 14a, a receiving process 14b, an destination determining process 14c, and a sending process 14d. Herein, the processes 14a to 14d respectively correspond to the detecting unit 3, the receiving unit 4, the destination determining unit 5, and the sending unit 6 illustrated in FIG. 1. The CPU 14 executes the transmission program based on the data stored in the RAM 16.

Meanwhile, the programs 15a to 15d need not be stored in the ROM 15 from the start. Alternatively, for example, it is possible to store those programs in a portable physical medium such as a flexible disk (FD), a CD-ROM, a DVD, a magnetic optical disk, or an IC card that is inserted in the computer 11; in a fixed physical medium such as an HDD installed inside or outside of the computer 11; or in another computer (or server) that is connected to the computer 11 via a public line, the Internet, a LAN, or a WAN. The computer 11 can then read those stored programs and execute the same.

According to an embodiment, it becomes possible to prevent degradation of transmission efficiency and reliability of the packets being transmitted in a ring network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
   a receiver circuit that receives a packet from a ring network;
   a determination circuit that determines whether the packet received by the receiver circuit is addressed to a local network, and whether the packet is allowed to circulate based on information that is included in a frame of the packet and indicates a number of times for which the packet circulates in the ring network, and determines a number of times when the packet is allowed to circulate and discards the packet when the packet is not allowed to circulate;
   a storage that stores one or more packets addressed to the local network;
   a detection circuit that detects whether the memory capacity of the storage is sufficient to store the received packet; and
   a transmitter circuit that sends the packet over the ring network when the determination circuit determines that the packet is addressed to the local network, when the detection circuit detects that the memory capacity of the storage is not sufficient to store the received packet, and when the packet is not discarded.

2. The transmission apparatus according to claim 1, wherein
   the determination circuit determines an importance level for the packet based on information that is included in a frame of the packet,
   the determination circuit outputs the packet to the transmitter circuit when the importance level of the packet exceeds a threshold importance level and discards the packet when the importance level for the packet does not exceed the threshold importance level, and
   the transmitter circuit sends the packet over the ring network from the determination circuit when the packet is not discarded.

3. A computer-readable, non-transitory medium storing a transmission program causing a computer to execute a process comprising:

receiving a packet from a ring network;
determining whether the packet received at the receiving is addressed to a local network, and whether the packet is allowed to circulate based on information that is included in a frame of the packet and indicates a number of times for which the packet circulates in the ring network, and determining a number of times when the packet is allowed to circulate and discarding the packet when the packet is not allowed to circulate;
detecting whether the memory capacity of a storage is sufficient to store the received packet; and
sending the packet over the ring network when the packet is determined to be addressed to the local network at the determining, when the memory capacity of the storage is determined to be not sufficient to store the received packet at the detecting, and when the packet is not discarded.

4. The computer-readable, non-transitory medium according to claim 3, wherein
the determining includes determining an importance level for the packet based on information that is included in a frame of the packet,
the determining includes outputting the packet to a transmitter circuit when the importance level of the packet exceeds a threshold importance level and discarding the packet when the importance level for the packet does not exceed the threshold importance level, and
the sending includes sending the packet over the ring network when the packet is not discarded.

5. A transmission method comprising:
receiving a packet from a ring network;
determining whether the packet received at the receiving is addressed to a local network, and whether the packet is allowed to circulate based on information that is included in a frame of the packet and indicates a number of times for which the packet circulates in the ring network, and determining a number of times when the packet is allowed to circulate and discarding the packet when the packet is not allowed to circulate;
detecting whether the memory capacity of a storage is sufficient to store the received packet; and
sending the packet over the ring network when the packet is determined to be addressed to the local network at the determining, when the memory capacity of the storage is determined to be not sufficient to store the received packet at the detecting, and when the packet is not discarded.

6. The transmission method according to claim 5, wherein
the determining includes determining an importance level for the packet based on information that is included in a frame of the packet,
the determining includes outputting the packet to a transmitter circuit when the importance level of the packet exceeds a threshold importance level and discarding the packet when the importance level for the packet does not exceed the threshold importance level, and
the sending includes sending the packet over the ring network when the packet is not discarded.

* * * * *